United States Patent [19]
Senga et al.

[11] Patent Number: 5,879,443
[45] Date of Patent: Mar. 9, 1999

[54] TEMPERATURE-SENSITIVE COLOR-MEMORIZING MICROENCAPSULATED PIGMENT

[75] Inventors: Kuniyuki Senga, Kasugai; Tsutomu Kito, Tajimi, both of Japan

[73] Assignee: The Pilot Ink Co., Ltd., Aichi-ken, Japan

[21] Appl. No.: 867,646

[22] Filed: Jun. 2, 1997

Related U.S. Application Data

[63] Continuation of Ser. No. 604,266, Feb. 21, 1996, abandoned, which is a continuation of Ser. No. 324,618, Oct. 18, 1994, abandoned.

[51] Int. Cl.⁶ .................................................. C08K 5/00
[52] U.S. Cl. .................... 106/498; 106/311; 106/493; 252/408.1; 252/586; 252/600; 252/962
[58] Field of Search .................. 106/498, 311, 106/493; 252/408.1, 600, 586, 962

[56] References Cited

U.S. PATENT DOCUMENTS

| | | | |
|---|---|---|---|
| 1,592,148 | 7/1926 | Munn | 401/1 |
| 4,028,118 | 6/1977 | Nakasuji et al. | 106/31.19 |
| 4,176,273 | 11/1979 | Fujie | 219/220 |
| 4,717,710 | 1/1988 | Shimizu et al. | 503/213 |
| 4,720,301 | 1/1988 | Kito et al. | 106/31.17 |
| 4,725,462 | 2/1988 | Kimura | 428/29 |
| 4,818,215 | 4/1989 | Taga | 431/126 |
| 4,820,683 | 4/1989 | Vervacke et al. | 503/210 |
| 4,895,827 | 1/1990 | Vervacke et al. | 503/210 |
| 4,917,643 | 4/1990 | Hippely | 446/14 |
| 4,920,991 | 5/1990 | Shibahashi et al. | 132/73 |
| 5,079,049 | 1/1992 | Kito et al. | 428/24 |

FOREIGN PATENT DOCUMENTS

| | | |
|---|---|---|
| 2538309 | 6/1984 | France . |
| 2591534 | 6/1987 | France . |
| 2135466 | 8/1984 | United Kingdom . |
| 2184250 | 6/1987 | United Kingdom . |
| 2205255 | 12/1988 | United Kingdom ..................... 446/14 |

OTHER PUBLICATIONS

Derwent Abstract AN 84–259405 [42] JP 59–156790.
Derwent Abstract AN 86–045677 [07] JP 60–264285.

*Primary Examiner*—Mark L. Bell
*Assistant Examiner*—Scott L. Hertzog
*Attorney, Agent, or Firm*—Fitzpatrick, Cella, Harper & Scinto

[57] ABSTRACT

A microcapsulated pigment contains, as reaction media one or more specific aliphatic acid alcohol esters obtained from monohydric aliphatic alcohols having odd numbers of carbon atoms and aliphatic carboxylic acids, these reaction media in a homogeneous compatible state with chromatic components are occluded in microcapsules to obtain characteristics of thermochromism with a hysteresis range (segment HG) from 8° C. to 30° C.

2 Claims, 1 Drawing Sheet

FIGURE
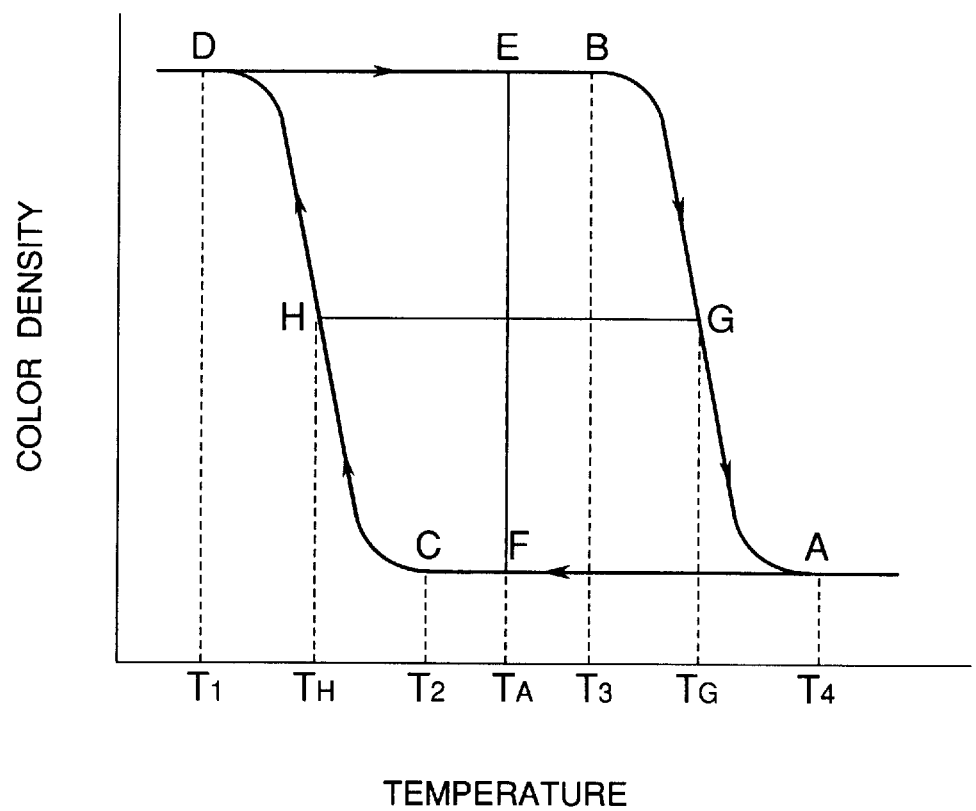

TEMPERATURE-SENSITIVE COLOR-MEMORIZING MICROENCAPSULATED PIGMENT

This application is a continuation of application Ser. No. 08/604,266 filed Feb. 21, 1996, now abandoned, which is a continuation of application Ser. No. 08/324,618, filed Oct. 18, 1994, now abandoned.

BACKGROUND OF THE INVENTION

1. Field of the Invention

The present invention relates to a temperature-sensitive color-memorizing microcapsulated pigment, more specifically, to a temperature-sensitive color-memorizing microcapsulated pigment which exhibits a wide hysteresis range of coloring/decloring alternately and reversibly caused by temperature changes and remains in the colored/decolored state at ambient temperatures without being continuously exposed to high/low temperatures required for causing the colored/decolored state.

2. Related Background Art

A temperature-sensitive color-memorizing microcapsulated material of the above-mentioned kind is disclosed in Japanese Patent Publication No. 4-17154. A widely-used, typical reversible thermochromatic material exhibiting thermochromatism at a certain color-change-causing temperature can be, at ambient temperatures, only in one of its two states, that is, in the state maintained at ambient temperature. The other state can not be maintained unless the material is continuously exposed to a temperature beyond the color-change-causing temperature in a case that the color-change-causing temperature is higher than ambient temperature, or to a temperature below the color-change-causing temperature in a case that the color-change-causing temperature is lower than ambient temperatures. The temperature-sensitive color-memorizing material disclosed in said patent publication, however, can selectively maintain, at ambient temperatures, both of its two states obtained at temperatures higher/lower than the color-change-causing temperature. By heating and cooling the material the two states can be alternately selected to be maintained at ambient temperatures. As a result, the temperature-sensitive color-memorizing material has been applied to various kinds of fields such as temperature-sensitive recording materials, toys, ornaments, printing materials, and so on.

As described in the Japanese Patent Publication No. 4-17154, the above-mentioned color-memorizing effect consists in thermochromism obtained only by systems having, as a constituent, compound(s) selected from a specific group of esters included in the group of esters used to control color forming reactions. In other words, the ester to be employed in the material can not be freely chosen and the applications of the temperature-sensitive color-memorizing material are limited. Accordingly, new materials of this kind which are more effective and more useful have been greatly demanded.

SUMMARY OF THE INVENTION

The object of the present invention is to provide a temperature-sensitive color-memorizing microcapsulated pigment capable of a wide range of applications by finding compounds which function as reaction media for exhibiting the above-mentioned color-memorizing effect and which can be selected more easily.

The present invention is based on the finding of the inventors that a system employing, as the reaction media, one or more specific aliphatic acid alcohol esters obtained from a specific group of monohydric aliphatic alcohols having odd numbers of carbon atoms and a group of aliphatic carboxylic acids having even numbers of carbon atoms exhibits thermochromism characteristics having wide hysteresis ranges ($\Delta H$) and excellent color memorizing effects.

A temperature-sensitive color-memorizing microcapsulated pigment according to the present invention is the combination in a homogenous compatible state of, as indispensable components, (A) an electron-donating chromatic organic compound, (B) an electron-accepting compound, and (C) one or more esters employed to control color forming reactions. The one or more esters are ones which realize the characteristics of reversible color change of the temperature-sensitive color-memorizing material having a wide hysteresis range with respect to the relation between color densities and temperatures. These three kinds of indispensable components in the homogenous compatible state are enclosed or occluded in microcapsules and change colors with a hysteresis range ($\Delta H$) from 8° C. to 30° C.

The ester(s) are selected from the group consisting of: (1) aliphatic acid alcohol esters obtained from monohydric aliphatic alcohols having odd numbers (not less than 9) of carbon atoms and aliphatic carboxylic acids having even numbers of carbon atoms and/or (2) aliphatic acid alcohol esters having 17 to 23 carbon atoms obtained from aliphatic carboxylic acids having even numbers (10 to 16) of carbon atoms and either n-pentyl alcohol or n-heptyl alcohol.

Further, the above-mentioned aliphatic acid alcohol esters may be selected from aliphatic acid alcohol esters having 17 to 37 carbon atoms obtained from n-nonyl alcohol, n-undecyl alcohol, n-tridecyl alcohol or n-pentadecyl alcohol.

BRIEF DESCRIPTION OF THE DRAWING

FIGURE illustrates graphically a relationship between color density and temperature indicating the hysteresis characteristic of the temperature-sensitive color-memorizing microcapsulated pigment according to the present invention.

The relationship between color density and temperature indicating the hysteresis characteristic of the temperature-sensitive color-memorizing microcapsulated pigment according to the present invention will be described with respect to FIGURE.

In FIGURE with the axis of ordinates, color densities, and the axis of abscissas, temperatures, the color density changes as the temperature changes as is indicated by the arrows. Point A indicates the color density at a temperature $T_4$, the lowest temperature which can cause a completely decoloring state (hereinafter referred as coloring/decoloring threshold temperature). Point B indicates the color density at a temperature $T_3$, the highest temperature at which a completely colored state can be maintained (hereinafter referred as highest color-maintaining temperature). Point C indicates the color density at a temperature $T_2$, the lowest temperature at which a completely decoloring state can be maintained (hereinafter referred as lowest decoloring maintaining temperature). And point D indicates the color density at a temperature $T_1$, the highest temperature which can cause a completely coloring state (hereinafter referred as coloring-completing temperature). At a temperature $T_A$, both of two phases, that is, a colored state indicated by point E and a decolored state indicated by point F can be obtained. As is clearly understood, within a temperature range, including the temperature $T_A$, in which the colored state and the decolored state are compatible with each other, the obtained colored or decolored state can be maintained. The length of the segment EF corresponds to the contrast of coloring/decoloring. And the length of the segment HG intersecting the middle point of the segment EF corresponds to the range of the hysteresis with respect to temperatures (hereinafter referred as hysteresis range ΔH). The greater the hysteresis range ΔH is, the easier the obtained colored or decolored state can be maintained. According to the experiments carried out by the inventors, the obtained colored or decolored state can be practically maintained if ΔH appears within a range from 8° C. to 30° C. The difference Δt between the coloring/decoloring threshold temperature $T_4$ and the highest color-maintaining temperature $T_3$ corresponds to sharpness of color change, wherein Δt should be from 1° C. to 10° C. to be effective for practical use.

In addition, the temperature range from $T_3$ to $T_2$, including $T_A$, within which both the colored state and the decolored state can be substantially maintained should be from 2° C. to 30° C. to be effective for practical use.

The ratio of said three kinds of components of the present invention is determined according to desired color densities, color-change-causing temperatures, color change behavior and the types of respective components employed. In general, however, 0.1 to 50 parts of the component (B), more preferably 0.5 to 20 parts thereof, is employed against 1 part of the component (A) in order to obtain desirable properties. Similarly, 1 to 800 parts of the component (C), more preferably 5 to 200 parts thereof, is employed against 1 part of the component (A). Note that parts are measured by weight ratio.

Each component may be a mixture of plural kinds of materials. Thus, so long as the characteristics of the pigment is not hindered, anti-oxidants, ultraviolet light absorbents, infrared absorbents, dissolving assistants, and so on may be added.

In addition, ordinary non-thermochromic pigments may be added so that the color change can occur from one color [1] to another [2] instead of coloring/decoloring.

The components (A), (B) and (C) will be described in detail.

The component (A), that is, the electron-donating chromatic organic compound(s) employed in the pigment according to the present invention may be selected from the group of conventionally known compounds consisting of diphenyl methane phthalides, fluorans, diphenyl methan azaphthalides, indolyl phthalides, phenyl indolyl phthalides, phenyl indolyl azaphthalides, styrinoquinolines, and so on.

The examples of this group are as follows:
3,3-bis(p-dimethylaminophenyl)-6-dimethylaminophthalide, 3-(4-diethylaminophenyl)-3-(1-ethyl-2-methylindol-3-yl)phthalide, 3-(4-diethylamino-2-ethoxyphenyl)-3-(1-ethyl-2-methylindol-3-yl)-4-azaphthalide, 1,3-dimethyl-6-diethylaminofluoran, 2-chloro-3-methyl-6-dimethylaminofluoran, 3-dibutylamino-6-methyl-7-anilinofluoran, 3-diethylamino-6-methyl-7-anilinofluoran, 3-diethylamino-6-methyl-7-xylidinofluoran, 2-(2-chloroanilino)-6-dibutylaminofluoran, 3,6-dimethoxyfluoran, 3,6-di-n-butoxyfluoran, 1,2-benz-6-diethylaminofluoran, 1-2-benz-6-dibutylaminofluoran, 1,2-benz-6-ethylisoamylaminofluoran, 2-methyl-6-(N-p-tolyl-N-ethylamino)fluoran, 2-(N-phenyl-N-methylamino)-6-(N-p-tolyl-N-etylamino)fluoran, 2-(3'-trifluoromethylanilino)-6-diethylaminofluoran, 3-chloro-6-cyclohexylaminofluoran, 2-methyl-6-cyclohexylaminofluoran, 3-methoxy-4-dodecoxystylinoquinoline, and so on.

The component (B), that is, the electron-accepting compound may be selected from the group consisting of compounds having active proton(s), pseudo-acidic compounds (which are not real acids but act as acids in the compositions to develop the color of the component (A)), compounds having electron hole(s).

The compounds having active proton(s) include: monophenol and/or polyphenol groups, as compounds having phenolic hydroxyl group(s), that is, compounds having monohydric and/or polyhydric phenolic hydroxyl group(s) and optionally having substituent(s) selected from alkyl groups, aryl groups, acyl groups, alkoxy carbonyl groups, carboxy groups, esters thereof, amide groups, halogen atoms, and so on; phenols having two or three identical substituents, such as bis or tris phenols; phenol-aldehyde condensation resins; metal salts of the above compounds having phenolic hydroxyl group(s); and so on.

The examples of the electron-accepting component (B) are as follows:
phenol, o-cresol, tert-butylcatechol, nonylphenol, n-octylphenol, n-dodecylphenol, n-stearylphenol, p-chlorophenol, p-bromophenol, o-phenylphenol, p-hydroxy-n-butyl benzoate, p-hydroxy-n-octylbenzoate, resorcin, dodecyl gallate, 2,2-bis(4'-hydroxyphenyl) propane, 4,4-dihydroxydiphenyl sulfone, 1,1-bis(4'-hydroxyphenyl)ethane, 2,2-bis(4'-hydroxy-3-methylphenyl)propane, bis(4-hydroxyphenyl)sulfide, 1-phenyl-1,1-bis(4'-hydroxyphenyl)ethane, 1,1-bis(4'-hydroxyphenyl)-3-methylbutane, 1,1-bis(4'-hydroxyphenyl)-2-methylpropane, 1,1-bis(4'-hydroxyphenyl)n-hexane, 1,1-bis(4'-hydroxyphenyl)n-heptane, 1,1-bis(4'-hydroxyphenyl)n-octane, 1,1-bis(4'-hydroxyphenyl)n-nonane, 1,1-bis(4'-hydroxyphenyl)n-decane, 1,1-bis(4'-hydroxyphenyl)n-dodecane, 2,2-bis(4'-hydroxyphenyl) butane, 2,2-bis(4'-hydroxyphenyl)ethyl propionate, 2,2-bis(4'-hydroxyphenyl)-4-methylpentane, 2,2-bis(4'-hydroxyphenyl)hexafluoropropane, 2,2-bis(4'-hydroxyphenyl)n-heptane, 2,2-bis(4'-hydroxyphenyl) n-nonane, and so on.

Though the above-mentioned compounds having phenolic hydroxyl group(s) can exhibit the most effective thermochromism characteristics, the component (B) may be selected from aromatic carboxylic acids, aliphatic carboxylic acids having 2 to 5 carbon atoms, metal salts of carboxylic acids, acidic phosphates and metal salts thereof, 1,2,3-triazole and derivatives thereof.

The examples of the component (C), the esters, are as follows:
n-pentadecyl acetate, n-tridecyl butylate, n-pentadecyl butylate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, n-pentadecyl behenate.

As long as the hysteresis characteristics are not greatly affected, the component (C) of the present invention selected from the above-mentioned esters may, if desirable, also contain other kinds of esters, alcohols, carboxylic acids, ketones, amides, and so on. In this case, preferably 20 parts of additive(s) or less can be added against 100 parts of the component (C) (by weight ratio) in order to obtain desired excellent color-memorizing effect.

The three kinds of indispensable components (A), (B) and (C) in the homogeneous compatible state are occluded or enclosed into microcapsules according to known encapsulation techniques. By micro granulation (0.5 to 50 μm, more preferably 1 to 30 μm) a wider hysteresis range ΔH can be obtained. As the components are protected in the capsule membranes, their properties are not degraded upon contact with chemically active substances such as acidic substances, alkaline substances, peroxides, and so on, or with other kinds of solvent components. At the same time, thermal resistance can be obtained.

The examples of available encapsulation techniques are interfacial polymerization, in situ polymerization, in-liquid curing coating, phase separation from an aqueous solution, phase separation from an organic solvent, in-gas suspending coating, spray drying, and so on, which are properly selected depending on the intended use. The surfaces of microcapsules, if preferable in practical use, may be coated with an additional resin membrane to improve stability and/or surface characteristics.

According to the present invention, one or more specific aliphatic acid alcohol esters obtained by esterification of monohydric aliphatic alcohols having odd numbers of carbon atoms and aliphatic carboxylic acid having even numbers of carbon atoms are employed in the composition exhibiting thermochromism as reaction media of color forming reactions caused by donation/acceptance of electron(s). The resultant composition exhibits thermochromism with a wide hysteresis range ΔH with respect to the relation between color densities and temperatures. Such a wide hysteresis range ΔH can not be realized when one or more aliphatic acid alcohol esters obtained from aliphatic alcohols having even numbers of carbon atoms are employed. In addition, as the above-mentioned composition is enclosed or occluded in microcapsules and used in the form of encapsulated micro granules, effective color-memorizing characteristics having a preferable hysteresis range ΔH from 8° C. to 30° C. can be obtained.

To manifestation of said excellent characteristics has not been fully explained, but the same characteristics and behavior of thermochromism, which will be shown in the measurement data, were repeatedly observed in the embodiments according to the present invention.

DESCRIPTION OF THE PREFERRED EMBODIMENTS

The preferred embodiments according to the present invention will be described below, wherein the present invention is not limited thereto.

First, the preparation of each embodiment of the microcapsuled pigment is described. And then the measuring method employed to measure hysteresis characteristics of said microcapsulated pigment with respect to temperature changes is described.

Note that the ratios of components are described by weight ratio.

[Preparation of Microcapsulated Pigment]

(A) 1.5 parts of 1.2-benz-6-diethylamino-fluoran serving as an electron-donating chromatic organic compound, (B) 5.0 parts of 2.2-bis(4'-hydroxyphenyl)-4-methylpentane as a phenol compound and (C) 50.0 parts of ester(s) according to the present invention were heated at 120° C. to be in a homogeneous compatible state, and mixed to a mixture solution consisting of 10 parts of EPON828 (epoxy resin manufactured by Yuka Shell Epoxy K.K.) and 10 parts of methyl ethyl ketone. The resultant solution was added dropwise to 100 parts of a 10% aqueous solution of gelatin and agitation was performed so that fine droplets were formed. Further, an aqueous solution prepared by dissolving 5 parts of Curing Agent U (adduct compound obtained by adding amines to epoxy resin, manufactured by Yuka Shell Epoxy K.K.) in 45 parts of water was gradually added to the above mixture being agitated. The resultant mixture was further agitated at 80° C. for about 5 hours to obtain a mixture containing microcapsulated pigment. This mixture was subjected to centrifugal separation to obtain microcapsulated pigment with water content of 40% (weight percentage).

[Measuring Method of Hysteresis Characteristics]

An ink was prepared by dispersing 40 parts of the microcapsulated pigment obtained as described above in 60 parts of emulsion of ethylene/vinyl acetate. The ink was printed on a sheet of woodfree paper with a screen printing machine. The printed sheet was heated and cooled as described in the following, and the behavior of color change was plotted.

The printed paper was set at the proper position of a color-difference meter [color-difference meter TC-3600 manufactured by K.K. Tokyo Denshoku]. The printed sheet was heated and cooled, and heated again in a range of 50 centigrade degrees, wherein the heating/cooling was carried out at a rate of 10 centigrade degrees/min. For example, Embodiment 1 at its initial temperature of −20° C. was heated up to 30° C. at the rate of 10 centigrade degrees/min, and then cooled to −20° C. at the same rate. Luminosity at various temperatures which was measured by the color-difference meter was plotted to obtain the relation between color densities (measured as luminosity) and temperatures, as is shown in FIG. 1. Thus, temperatures $T_1$, $T_2$, $T_3$, $T_4$, $T_H$ (determined as the temperature at which 50% of the highest color density of the ink is observed during the coloring process), $T_G$ (determined as the temperature at which 50% of the highest color density of the ink is observed during decolonizing process), and ΔH (the length of the segment HG). Table 1 shows the temperature-sensitive color change characteristics of the microcapsulated pigments employing esters of respective embodiments according to the present invention.

TABLE 1

Temperature-Sensitive Color Change Characteristics of the Embodiments

| Embodiment No. | Ester | Temperature (°C.) | | | | | | |
|---|---|---|---|---|---|---|---|---|
| | | $T_1$ | $T_H$ | $T_2$ | $T_3$ | $T_G$ | $T_4$ | ΔH |
| 1 | n-undecyl caprylate | −12 | −8 | −5 | −2 | 2 | 7 | 10 |
| 2 | n-nonyl caprate | −14 | −7 | −5 | 8 | 12 | 15 | 19 |
| 3 | n-tridecyl caprate | 8 | 11 | 13 | 23 | 26 | 28 | 15 |
| 4 | n-nonyl laurate | −8 | −2 | 1 | 11 | 14 | 17 | 16 |

TABLE 1-continued

Temperature-Sensitive Color Change
Characteristics of the Embodiments

| Embodiment No. | Ester | Temperature (°C) | | | | | | |
|---|---|---|---|---|---|---|---|---|
| | | $T_1$ | $T_H$ | $T_2$ | $T_3$ | $T_G$ | $T_4$ | $\Delta H$ |
| 5 | n-undecyl laurate | 6 | 10 | 13 | 29 | 31 | 33 | 21 |
| 6 | n-tridecyl laurate | 18 | 21 | 23 | 27 | 32 | 35 | 11 |
| 7 | n-pentyl myristate | −10 | −4 | −3 | 1 | 4 | 10 | 8 |
| 8 | n-heptyl myristate | −2 | 1 | 4 | 8 | 11 | 16 | 10 |
| 9 | n-nonyl myristate | 5 | 7 | 9 | 19 | 21 | 24 | 14 |
| 10 | n-undecyl myristate | 16 | 18 | 19 | 30 | 32 | 34 | 14 |
| 11 | n-pentyl palmitate | 0 | 5 | 8 | 13 | 15 | 20 | 10 |
| 12 | n-heptyl palmitate | 6 | 9 | 11 | 21 | 23 | 27 | 14 |
| 13 | n-nonyl palmitate | 13 | 16 | 18 | 28 | 30 | 33 | 14 |
| 14 | n-undecyl palmitate | 22 | 26 | 27 | 34 | 36 | 40 | 10 |
| 15 | n-nonyl stearate | 22 | 25 | 26 | 35 | 37 | 40 | 12 |
| 16 | n-undecyl behenate | 42 | 44 | 45 | 51 | 53 | 58 | 9 |

Microcapsulated pigments employing esters which were obtained by esterification of monohydric aliphatic alcohols having even numbers of carbon atoms and aliphatic carboxylic acids were prepared in the same manner as described above, and hysteresis ranges ΔH thereof were measured as described. The results are:

n-butyl stearate; 1 centigrade degree
n-octyl stearate; 7 centigrade degrees
n-decyl myristate; 7 centigrade degrees
n-decyl palmitate; 5 centigrade degrees
n-decyl stearate; 5 centigrade degrees
n-lauryl stearate; 2 centigrade degrees and
myristyl myristate; 6 centigrade degrees.

[Application 1]

In the same manner as described above, a microcapsulated pigment [$T_1=6°$ C. and $T_4=33°$ C.] exhibiting reversible thermochromism of vermilion/colorless was prepared, wherein 2-chloro-3-methyl-6-diethylaminofluoran serving as the component (A), 2,2-bis(4'-hydroxyphenyl) propane as the component (B) and undecyl laurate as component (C) in a homogeneous compatible state were enclosed in the microcapsules. 40 parts of thus prepared microcapsulated pigment was dispersed in 60 parts of emulsion of ethylene-vinyl acetate to prepare a printing ink. English words, for example, "DEVIL" and "ANGEL" were printed on a sheet of woodfree paper in said ink, while the corresponding Japanese translations "AKUMA" and "TENSHI" were printed near their respective corresponding English words on the same sheet in an ordinary ink (which is not temperature sensitive nor change colors). Similarly, other English words and corresponding Japanese translations were printed on the sheet. Thus, an English Word Excercize Sheet was made.

Both the English words and the Japanese translations could be read on said English Word Excercize Sheet. Then, the sheet was heated over 33° C., when English words disappeared. This decolored state of the English words was maintained when the sheet was left at the room temperature of about 25° C. In this case, only the Japanese words could be seen at the room temperature. Next, the sheet was cooled below about 6° C., when the vermilion English words appeared. This colored state of the English word was maintained when the sheet was left at the room temperature. The colored state and the decolored state of the English words could be alternately and repeatedly obtained and maintained at ambient temperatures, which is very useful to the learners who want to memorize English words.

[Application 2]

(A) 1,3-dimethyl-6-diethylaminofluoran, (B) 2,2-bis(41-hydroxyphenyl)-4-methylpentane and (C) n-nonyl stearate in a homogenious compatible state were microcapsulated according to interfacial polymerization of epoxy resin and amine to obtain microcapsulated pigment having a mean diameter of 10 μm. The resultant microcapsulated pigment exhibited reversible thermochromism of orange/colorless [$T_1=22°$ C. and $T_4=40°$ C.]

5 parts of this microcapsulated pigment, 1 part of non-color-changing yellow pigment and 94 parts of polyethylene chips were fused and mixed at about 170° C. to prepare chips exhibiting thermochromism.

Then, the chips were molded at about 150° C. with a blow molding machine to obtain a plastic gold fish exhibiting thermochromism. This gold fish was orange in a temperature range from 25° C. to 35° C., but turned yellow when put into hot water over 40° C. This yellow state was maintained when the gold fish was left in the temperature range from 25° C. to 35° C. When cooled below 22° C., the gold fish turned orange. This orange state was maintained when the gold fish was left in the temperature range from 25° C. to 35° C. The orange state and the yellow state were alternately and repeatedly maintained in the temperature range from 25° C. to 35° C.

[Application 3]

(A) 3-dibutylamino-6-methyl-7-anylinofluoran, (B) 1,1-bis(4'-hydroxyphenyl)-3-methylbutane and (C) undecyl myristate in a homogenious compatible state were microcapsulated according to interfacial polymerization of epoxy resin and amine to obtain microcapsulated pigment having a mean diameter of 10 μm. The resultant microcopsulated pigment exhibited reversible thermochromism of black/colorless [$T_1=16°$ C. and $T_4=34°$ C.].

An ink was prepared by dispersing said microcapsulated pigment in emulsion of etylene-vinyl acetate. The ink was printed on woodfree white paper with a screen printing machine using a 180-mesh screen to prepare a recording sheet exhibiting thermochromism.

The resultant recording sheet was black at ambient temperatures, but turned white when heated over 34° C. This white state was maintained when the sheet was left at the room temperature of about 25° C. Then, the sheet was cooled below about 16° C., when it turned black. This black state was maintained when the sheet was left at the room temperature.

The black state and the white state of the recording sheet could be alternately and repeatedly obtained and maintained at ambient temperatures. On the recording sheet in the black state at the room temperature, white images could be drawn with a heating type thermopen (generating heat of 45° C.). On the other hand, on the recording sheet in the white state, black images could be drawn with a cooling type thermopen (of 3° C.). In both cases, images could be maintained at the room temperature.

The microcapulated pigment according to the present invention effectively exhibits reversible thermochromism of coloring/decoloring with a hysteresis range (ΔH) from 8° C. to 30° C. with respect to color-densities and temperatures. Both of the two states of thermochromism obtained at temperatures higher/lower than the color-change-causing temperature are alternately memorized and maintained at ambient temperatures. By heating or cooling the pigment, both of the two state, one at a time, can be reversibly obtained and maintained. In addition, as such thermochromism is derived from employing, as reaction media of color forming reactions, one or more aliphatic esters obtained from esterification of monohydric aliphatic alcohols having odd numbers of carbon atoms and aliphatic carboxylic acids having even number of carbon atoms, a wide hysteresis range ΔH and excellent color-memorizing effect can be realized. Accordingly the microcapsulated pigment according to the present invention is of great use in the practical fields of applications.

The microcapsulated pigment according to the present invention may be used for various kinds of painting and printing as paint and printing ink, or fused and mixed with thermally plastic resin and wax to be used as on excipient in various form.

What is claimed is:

1. A temperature-sensitive color-memorizing pigment, comprising;

a homogeneous composition of (A) an electron-donating chromatic organic compound, (B) an electron-accepting compound and (C) at least one ester for controlling color forming reaction selected from the group consisting of (1) an aliphatic acid alcohol ester obtained from monohydric straight chain aliphatic alcohol having an odd number of at least 9 carbon atoms and aliphatic carboxylic acid having an even number of carbon atoms, and (2) an aliphatic acid alcohol ester having 17 to 23 carbon atoms obtained from aliphatic carboxylic acid having an even number of 10–16 carbon atoms, and one of n-pentyl or n-heptyl alcohol;

said homogeneous composition being microencapsulated and exhibiting in the microencapsulated state a color change with a hysteresis range (ΔH) from 8° C. to 30° C. and differences (Δt) (i) between the lowest temperature (T4) which can cause a completely decoloring state and the highest temperature (T3) at which a completely colored state can be maintained is in a range of from 1° C. to 10° C., and (ii) between said temperature (T3) and a lowest temperature (T2) at which a completely decoloring state can be maintained is in a range of from 2° C. to 30° C.

2. A temperature-sensitive color-memorizing microencapsulated pigment according to claim 1, wherein said aliphatic acid alcohol esters have 17 to 37 carbon atoms and are obtained from esterification of n-nonyl alcohol, n-undecyl alcohol, n-tridecyl alcohol or n-pentadecyl alcohol and an aliphatic carboxylic acid having an even number of carbon atoms.

* * * * *